United States Patent
Kawaguchi et al.

(10) Patent No.: US 9,640,844 B2
(45) Date of Patent: May 2, 2017

(54) TEMPERATURE ADJUSTMENT DEVICE

(71) Applicant: CALSONIC KANSEI CORPORATION, Saitama-shi, Saitama (JP)

(72) Inventors: Tatsunari Kawaguchi, Saitama (JP); Takashi Otsuka, Saitama (JP); Toshiyuki Motohashi, Saitama (JP); Satoshi Sakuma, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 56 days.

(21) Appl. No.: 14/781,501

(22) PCT Filed: Mar. 26, 2014

(86) PCT No.: PCT/JP2014/058459
§ 371 (c)(1),
(2) Date: Sep. 30, 2015

(87) PCT Pub. No.: WO2014/162939
PCT Pub. Date: Oct. 9, 2014

(65) Prior Publication Data
US 2016/0043451 A1   Feb. 11, 2016

(30) Foreign Application Priority Data

Apr. 1, 2013  (JP) ................. 2013-076154

(51) Int. Cl.
*H01M 10/613* (2014.01)
*B60K 11/02* (2006.01)
(Continued)

(52) U.S. Cl.
CPC ........... *H01M 10/613* (2015.04); *B60K 11/02* (2013.01); *H01M 10/625* (2015.04);
(Continued)

(58) Field of Classification Search
CPC ............. H01M 10/613; H01M 10/625; H01M 10/6568; H01M 10/66; H01M 10/6556; B60K 11/02
See application file for complete search history.

(56) References Cited

U.S. PATENT DOCUMENTS

2012/0028099 A1* 2/2012 Aoki ................... H01M 2/1077
429/120
2012/0107663 A1* 5/2012 Burgers .................... F28F 3/06
429/120
(Continued)

FOREIGN PATENT DOCUMENTS

JP   2004-20104 A   1/2004
JP   2010-258022 A   11/2010
(Continued)

*Primary Examiner* — Stewart Fraser
(74) *Attorney, Agent, or Firm* — Foley & Lardner LLP

(57) ABSTRACT

A temperature adjustment device includes a cooling member and a connecting member. The cooling member consists of a first plate and a second plate. The first plate is thermally abutted against a heat-generating member. The second plate is stacked on a lower surface of the first plate to define a cooling space with the first plate, the cooling space a cooling medium flows through, and being configured to include an inlet and an outlet of the cooling medium on a bottom surface facing against the first plate. The connecting member is the connecting member to a temperature adjustment circuit, and that is configured with a tube member having a flat part. The connecting member includes a connecting port connected to the inlet or the outlet on the flat part, and that is laminated and arranged on the second plate such that the flat part is abutted against the second plate.

11 Claims, 16 Drawing Sheets

(51) Int. Cl.
*H01M 10/625* (2014.01)
*H01M 10/6556* (2014.01)
*H01M 10/6568* (2014.01)
*H01M 10/66* (2014.01)

(52) U.S. Cl.
CPC ... *H01M 10/6556* (2015.04); *H01M 10/6568* (2015.04); *H01M 10/66* (2015.04)

(56) References Cited

U.S. PATENT DOCUMENTS

| | | | |
|---|---|---|---|
| 2012/0177960 A1* | 7/2012 | Tasai | B60H 1/00278 429/72 |
| 2013/0244077 A1* | 9/2013 | Palanchon | F28F 3/12 429/120 |
| 2014/0363709 A1 | 12/2014 | Tasai et al. | |

FOREIGN PATENT DOCUMENTS

| | | |
|---|---|---|
| JP | 2012-37136 A | 2/2012 |
| JP | 2012-156124 A | 8/2012 |
| WO | WO 2008/078586 A1 | 7/2008 |

\* cited by examiner

SECTIONAL VIEW TAKEN ALONG V-V

SECTIONAL VIEW TAKEN ALONG VI-VI

TEMPERATURE ADJUSTMENT DEVICE

TECHNICAL FIELD

The present invention relates to a temperature adjustment device.

BACKGROUND ART

A power storage apparatus including a cooling member for adjusting temperature of a plurality of battery modules by thermally abutting against bottom surfaces of the plurality of battery modules and by utilizing a cooling medium flowing through the interior thereof has been recently proposed. The battery modules consist of assemblies of a plurality of battery cells.

In a technique disclosed in JP2012-156124A, an inflow port and an outflow exit for a cooling medium formed of tube members are provided on a side surface of a cooling member, and the inflow port and the outflow exit are connected to a temperature adjustment circuit including a pump, a tank and a radiator. The cooling medium is then circulated between the temperature adjustment circuit and the cooling member to cool the cooling member, thereby adjusting the temperature of the heat-generating battery modules at the bottom surfaces thereof.

SUMMARY OF INVENTION

A power storage apparatus mounted on a vehicle is arranged, for example, in a portion below rear seats, which is a dead space of a space in the vehicle. A dimension of the portion below the rear seats in the vertical direction is limited due to the limitation with regard to a height dimension from a floor surface. Therefore, the power storage apparatus to be arranged in this portion also needs to have a small dimension in the vertical direction.

However, in the technique disclosed in JP2012-156124A, thicknesswise dimension of the cooling member is greater than outer dimension of the tube members forming the inflow port and the outflow exit for supplying/discharging the cooling medium to/from the cooling member. In a case in which the thicknesswise dimension of the cooling member is large as described above, the size of the power storage apparatus, which includes the battery modules arranged above the cooling member, is increased. As a result, a living space in a cabin is reduced.

The present invention is made in view of the above description, and an object thereof is to provide a temperature adjustment device that is suitable for reducing thicknesswise dimension.

A temperature adjustment device according to an aspect of the present invention includes a cooling member consisting of a first plate and a second plate, the first plate being thermally abutted against a heat-generating member, and the second plate being stacked on a lower surface of the first plate to define a cooling space with the first plate, the cooling space a cooling medium flows through, and being configured to include an inlet and an outlet of the cooling medium on a bottom surface facing against the first plate and a connecting member that is a connecting member to a temperature adjustment circuit, the connecting member being configured with a tube member having a flat part, the connecting member including a connecting port connected to the inlet or the outlet on the flat part, and the connecting member being laminated and arranged on the second plate such that the flat part is abutted against the second plate.

With the temperature adjustment device according to the above-mentioned aspect, an inlet connecting member and an outlet connecting member are configured such that pipe pathways are flat, and the inlet connecting member and the outlet connecting member are laminated and arranged on the lower surface of the cooling member, and thereby, the cooling medium is supplied/discharged to/from the lower surface of the cooling member. With the temperature adjustment device according to the above-mentioned aspect, it is possible to make the dimensions of the inlet connecting member and the outlet connecting member in the vertical direction small. In combination with the fact that limitation caused to the thicknesswise dimension of the cooling member by the respective the dimensions of the inlet connecting member and the outlet connecting member in the vertical direction is reduced, it is possible to make the dimension of the temperature adjustment device in the vertical direction small. As a result, it is possible to reduce the size of a power storage apparatus by reducing the dimension of the power storage apparatus in the vertical direction of a vehicle, thereby making it possible to increase a living space in a cabin (a space at rear seats).

DESCRIPTION OF EMBODIMENTS

Embodiments of the present invention will be described below with reference to the attached drawings.

(First Embodiment)

Figure 1:
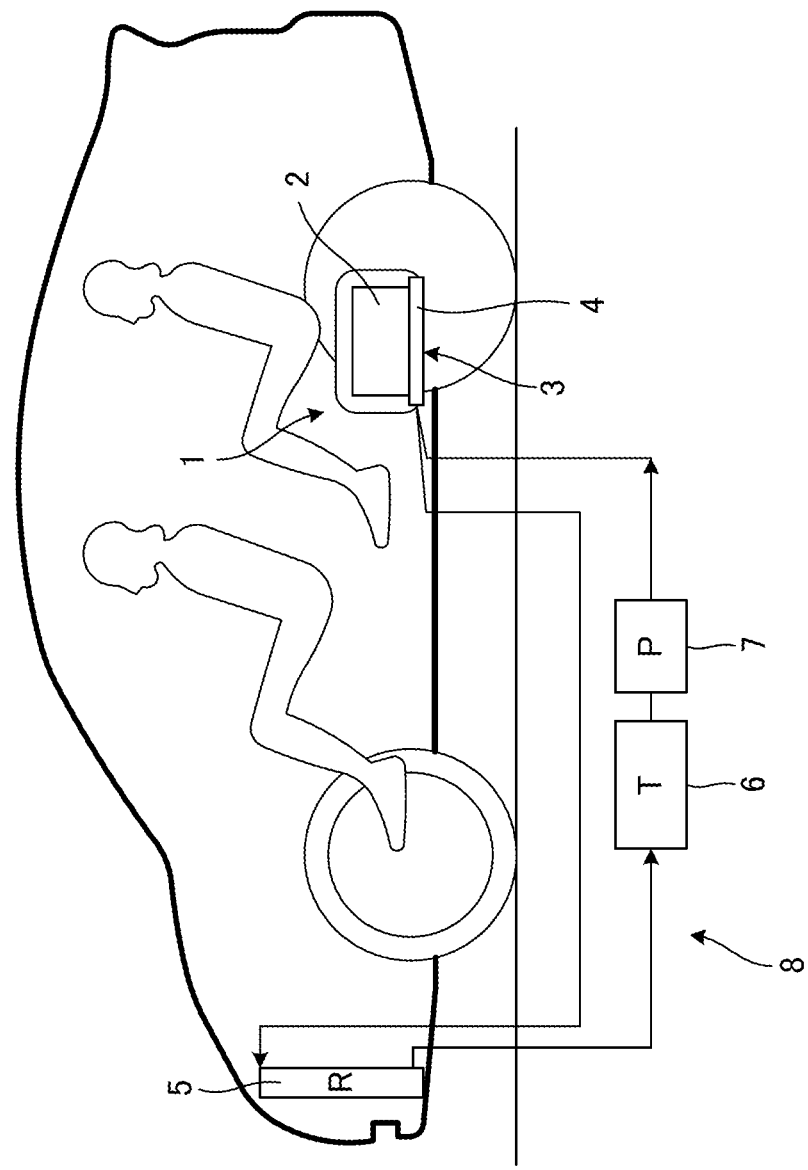
FIG. 1 is a schematic configuration diagram of a power storage apparatus including a temperature adjustment device according to a first embodiment.
Figure 2:
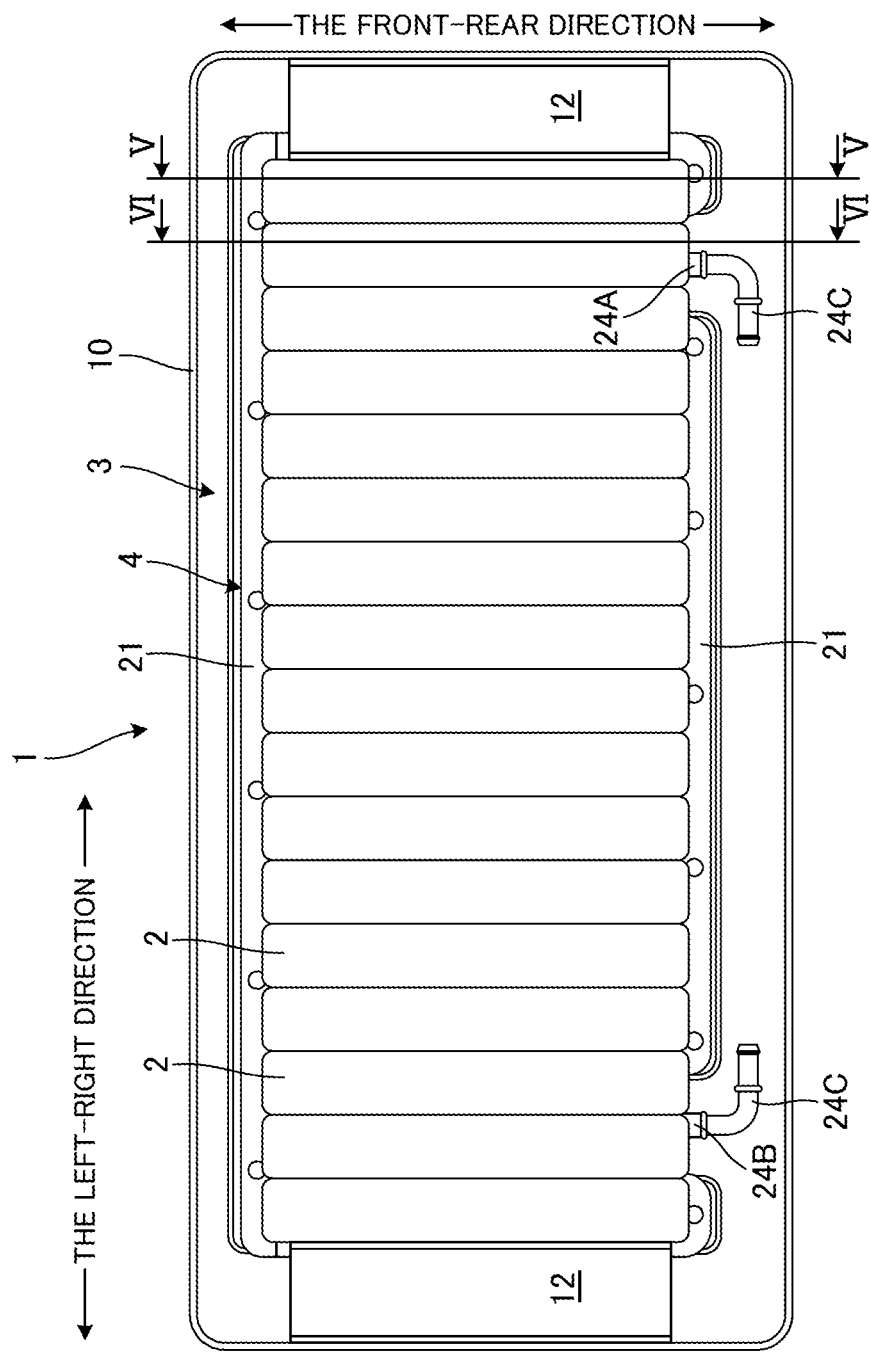
FIG. 2 is a plan view of the power storage apparatus including the temperature adjustment device according to the first embodiment.
Figure 3:
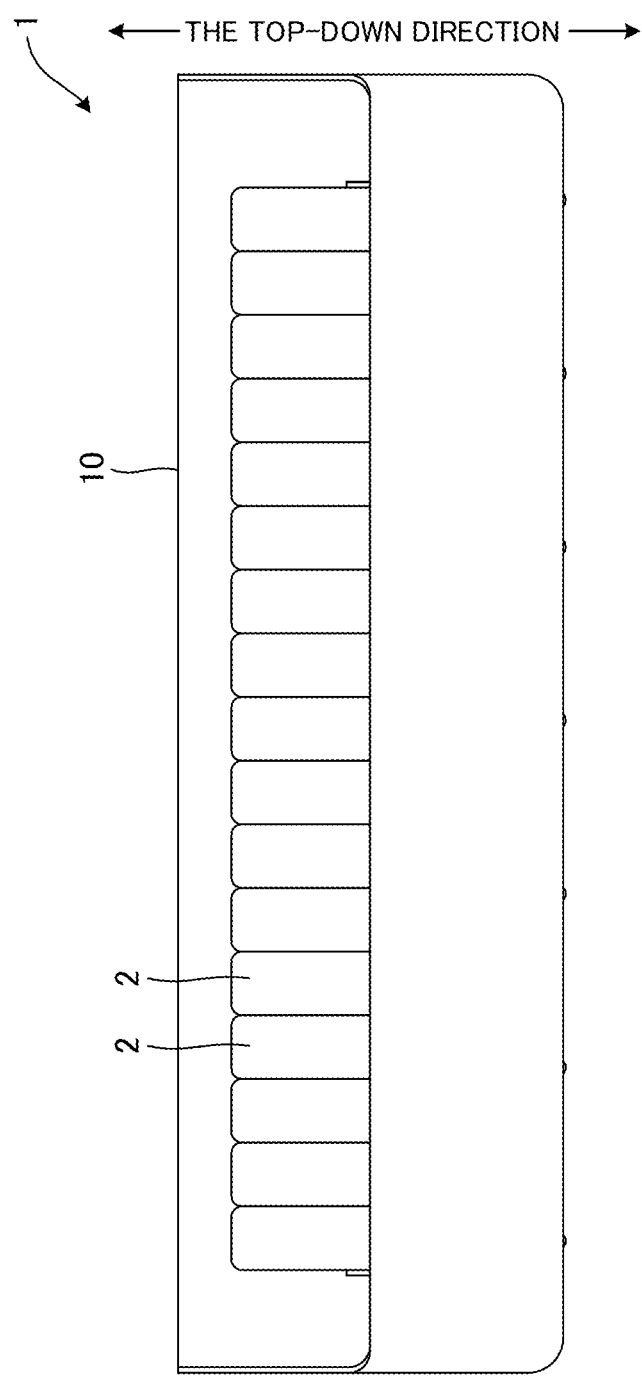
FIG. 3 is a front view of the power storage apparatus including the temperature adjustment device according to the first embodiment.
Figure 4:
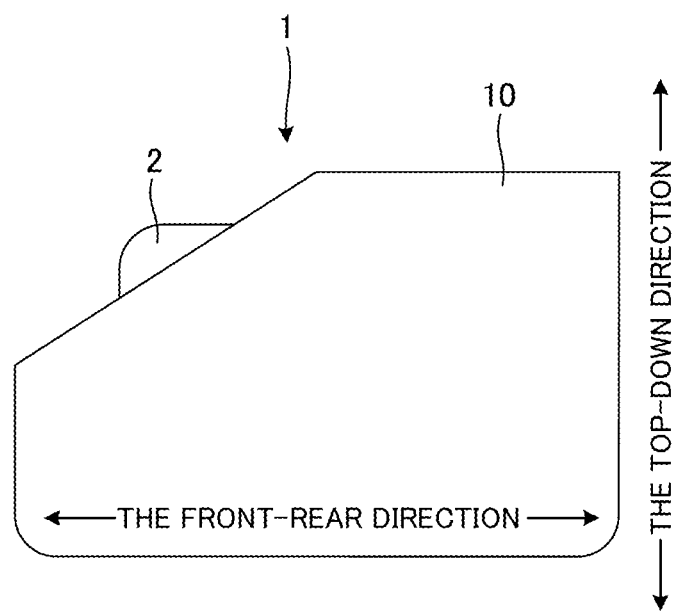
FIG. 4 is a side view of the power storage apparatus including the temperature adjustment device according to the first embodiment.
Figure 5:
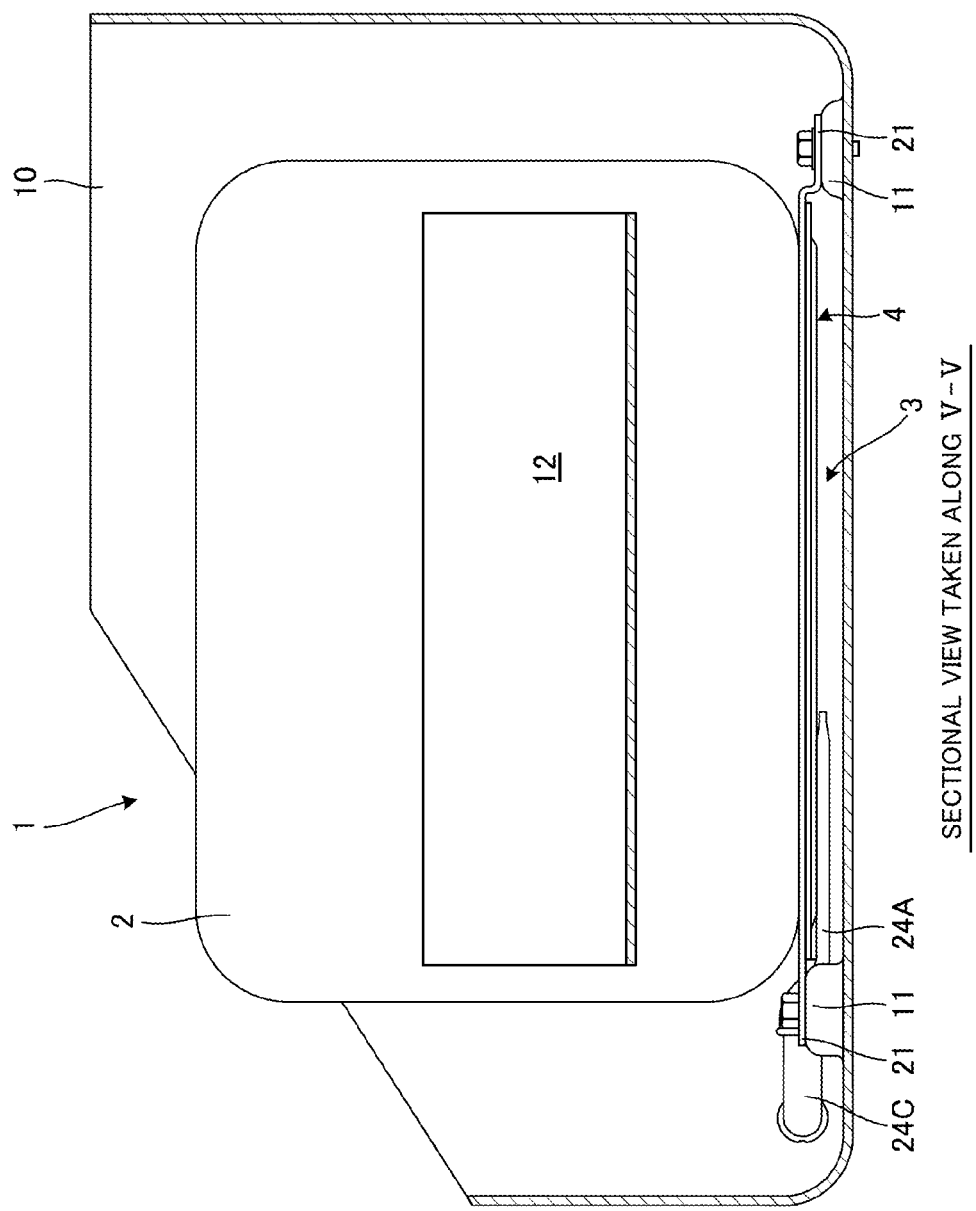
FIG. 5 is a sectional view taken along V-V in FIG. 2.
Figure 6:
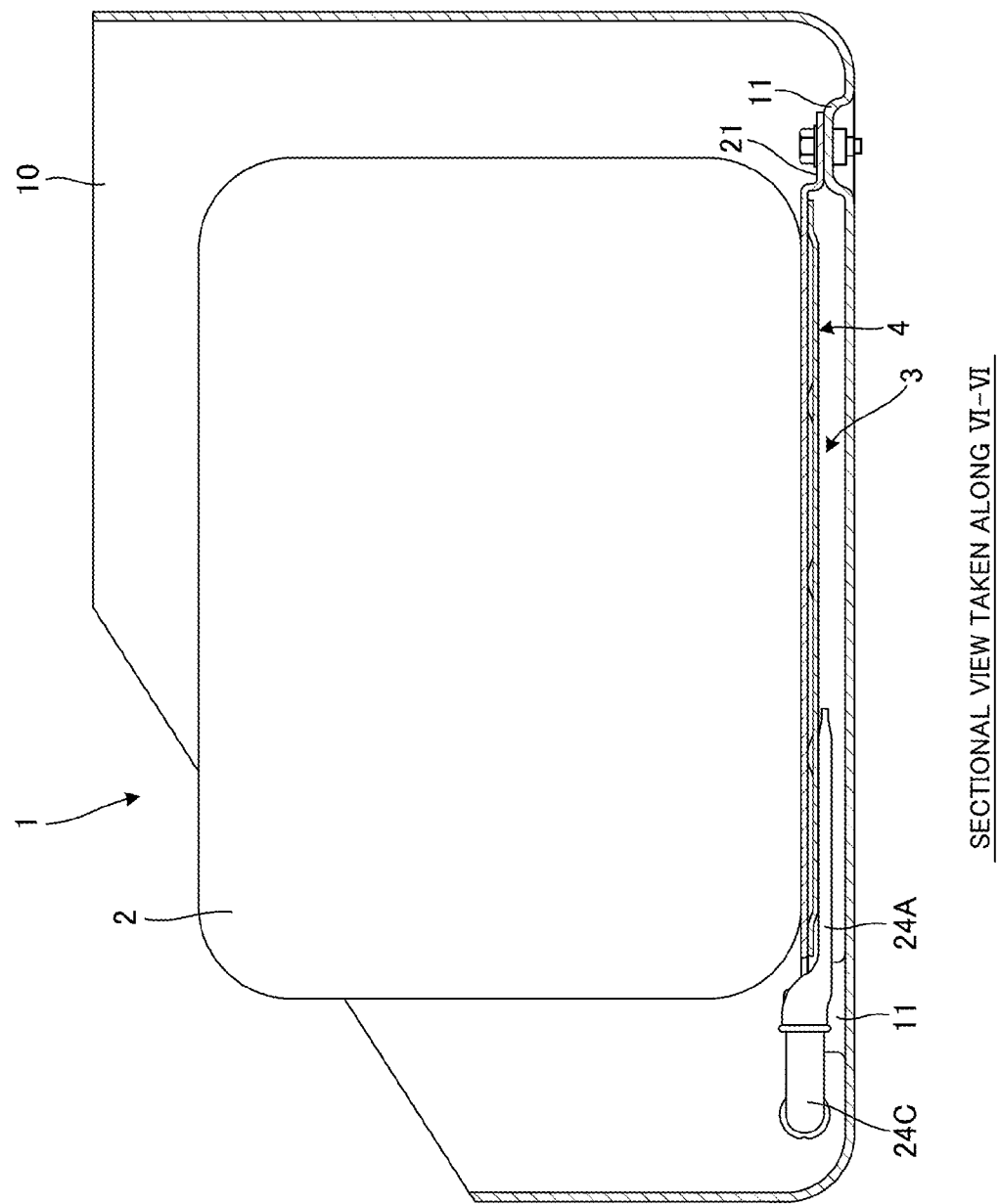
FIG. 6 is a sectional view taken along VI-VI in FIG. 2.

As shown in FIG. 1, a power storage apparatus 1 is arranged between a lower surface of a seat cushion of rear seats of a vehicle and a floor of a vehicle body. The power storage apparatus 1 supplies power to a motor generator that serves as a driving source for running an electric car. The power storage apparatus 1 consists of a plurality of battery modules 2 and a temperature adjustment device 3. Electric power is stored in the plurality of battery modules 2. The temperature adjustment device 3 adjusts temperature of the plurality of battery modules 2 with a cooling member 4 that is thermally in contact with the bottom surfaces of the plurality of battery modules 2. A cooling efficiency may be improved by providing a heat-conducting member between the bottom surfaces of the battery modules 2 and the cooling member 4.

The cooling member 4 constitutes the temperature adjustment device 3. An interior of the cooling member 4 is made hollow. The temperature adjustment device 3 is connected to a temperature adjustment circuit 8. The temperature adjustment circuit 8 includes a radiator 5, a tank 6, and a pump 7. The temperature adjustment device 3 supplies a cooling medium to an inlet of the cooling member 4 by pumping the cooling medium by the pump 7 from the tank 6, thereby allowing the cooling medium to flow through the interior space in the cooling member 4. The cooling medium is then returned from an outlet of the cooling member 4 to the tank 6 through the radiator 5. With such a circulation of the cooling medium, the temperature adjustment device 3 cools the cooling member 4 from the inside thereof and adjusts the temperature of the plurality of battery modules 2 through the bottom surfaces of the battery modules 2.

As shown in FIGS. 2 to 6, the power storage apparatus 1 is accommodated in a battery case 10 having a box shape that opens upward. In the following description, the front-rear direction of the vehicle, the left-right direction of the vehicle, and the top-down direction of the vehicle will be referred to simply as "the front-rear direction", "the left-right direction", and "the top-down direction", respectively.

The battery case 10 is arranged in a portion below the rear seats. Therefore, the battery case 10 is formed so as to have a slightly flat box shape that is longer in the left-right direction and shorter in the front-rear direction. The temperature adjustment device 3 is arranged on the bottom plate side in the battery case 10. The plurality of battery modules 2 are arranged on the temperature adjustment device 3.

The temperature adjustment device 3 has a flat-plate shape. The temperature adjustment device 3 is formed so as to have an external shape that forms predetermined gaps that are set in advance with wall surfaces of the battery case 10 in the longitudinal direction and the width direction. The temperature adjustment device 3 is arranged so as to cover the central region of the bottom plate of the battery case 10. Fixing regions 21 are formed at end portions of the temperature adjustment device 3 in the front-rear direction. The fixing regions 21 extend in the left-right direction. Protrusions 11 are provided on the bottom plate of the battery case 10. The protrusions 11 are provided at portions of the bottom plate corresponding to the fixing regions 21 and protrude upwards. A plurality of protrusions 11 are provided with appropriate gaps therebetween in the left-right direction. The protrusions 11 are provided by emboss processing. The fixing regions 21 are attached by being fixed to the protrusions 11 with bolts.

The plurality of battery modules 2 are arranged on a top surface of the temperature adjustment device 3 so as to be in contact at the bottom surface. The plurality of battery modules 2 are arranged so as to be arrayed in the longitudinal direction of the battery case 10. The plurality of battery modules 2 are aligned in the arrayed direction by abutting against support members 12 at both end portions in the arrayed direction. The support members 12 are provided so as to extend towards the inside from the wall surfaces of the battery case 10 at both ends in the longitudinal direction.

As shown in FIGS. 7 to 11, the temperature adjustment device 3 is constituted of the cooling member 4, an inlet connecting member 24A, and an outlet connecting member 24B. The cooling member 4 is constituted of a first plate 22 that is an upper plate and a second plate 23 that is a lower plate. The plurality of battery modules 2 are arranged on the first plate 22. Therefore, the first plate 22 is thermally abutted against the plurality of battery modules 2 that serve as heat-generating members. The second plate 23 is stacked on a lower surface of the first plate 22. The first plate 22 and the second plate 23 are manufactured by subjecting aluminum plates to press working.

Both of the inlet connecting member 24A and the outlet connecting member 24B are connecting members to the temperature adjustment circuit 8 and are fixed to the lower surface of the second plate 23. The inlet connecting member 24A and the outlet connecting member 24B individually include connector pipes 24C. Both of the inlet connecting member 24A and the outlet connecting member 24B are connected to the temperature adjustment circuit 8 through the connector pipes 24C. The inlet connecting member 24A is a connecting member that allows flow of the cooling medium to be supplied to the cooling member 4. The outlet connecting member 24B is a connecting member that allows flow of the cooling medium that has been discharged from the cooling member 4.

Figure 7:
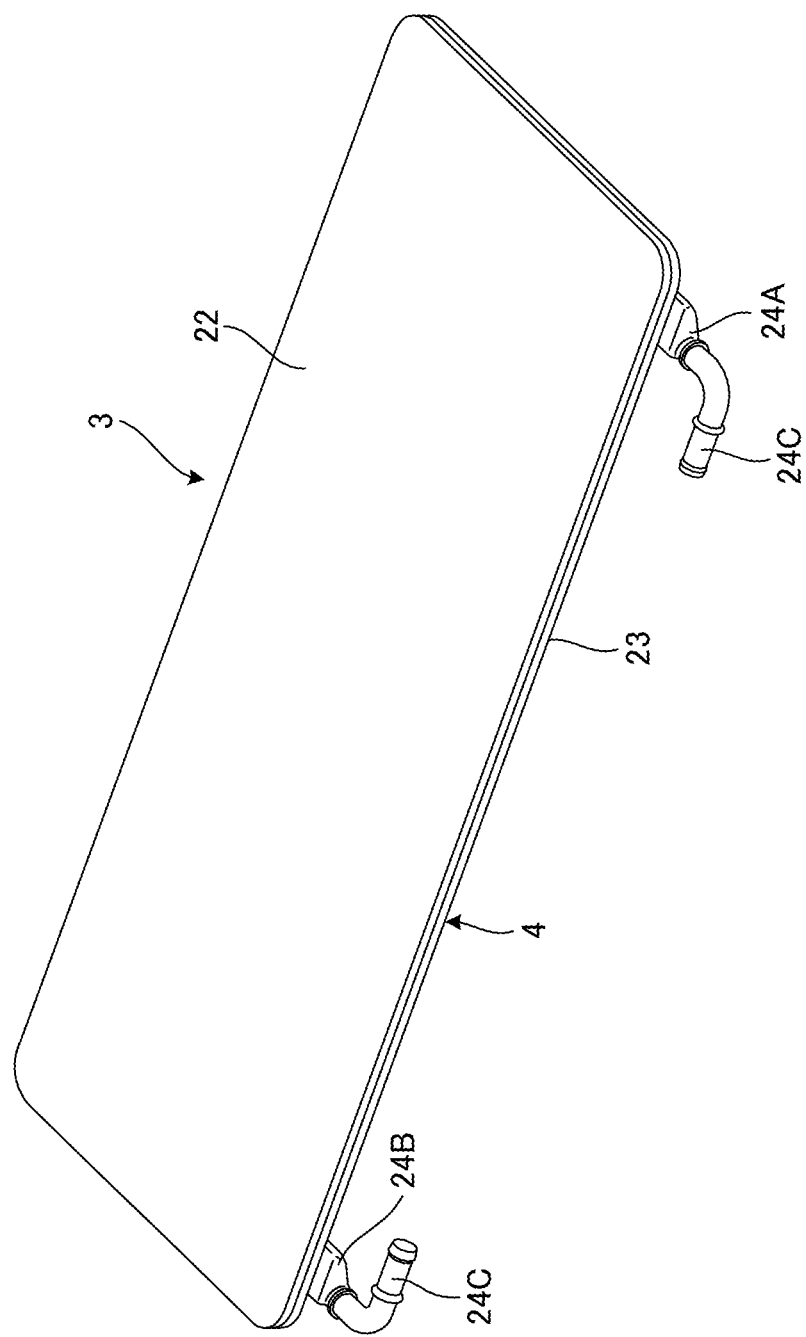
FIG. 7 is a perspective view of the temperature adjustment device according to the first embodiment.
Figure 8:
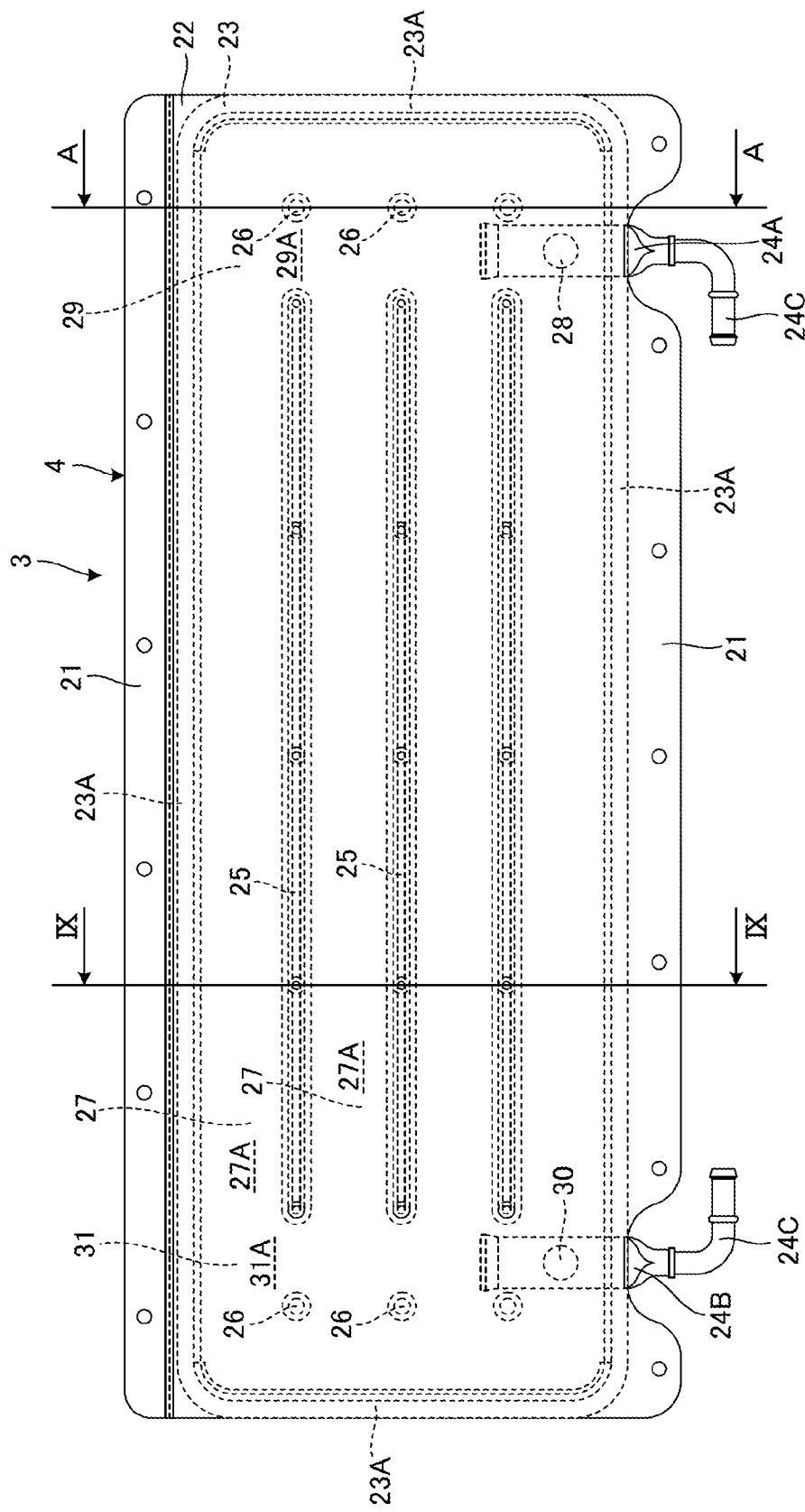
FIG. 8 is a plan view of the temperature adjustment device according to the first embodiment.
Figure 11:
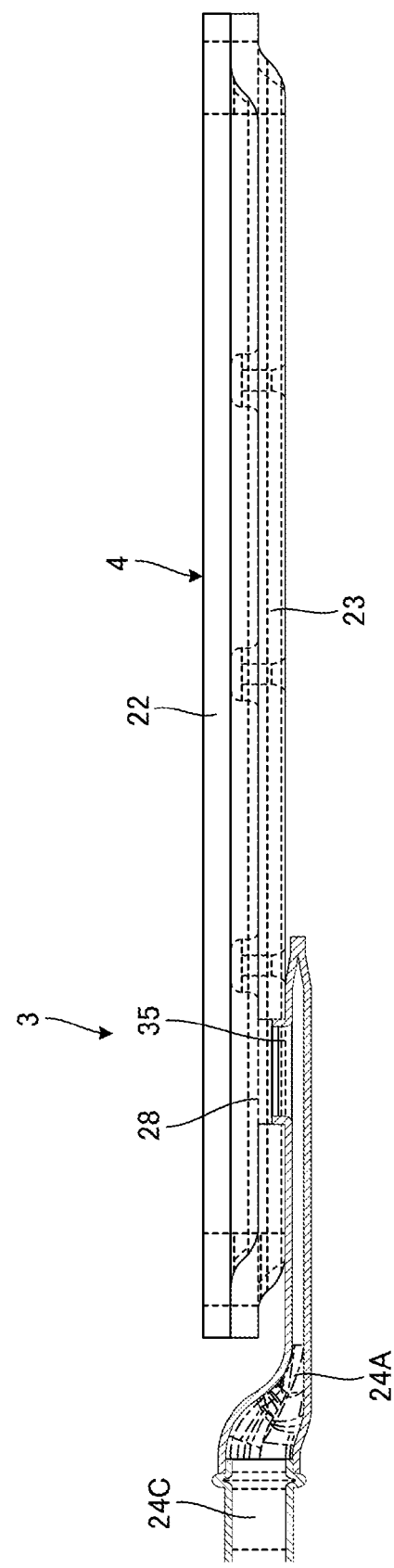
FIG. 11 is a sectional view of the temperature adjustment device according to the first embodiment, and is the sectional view including a connecting member.

As shown in FIG. 8, the first plate 22 is formed so as to have a plane shape. The first plate 22 includes the fixing regions 21. The fixing regions 21 are respectively provided at both end portions of the first plate 22 in the front-rear direction. The fixing regions 21 are fixed to the protrusions 11 with bolts. In FIGS. 7 and 11, illustration of the fixing regions 21 is omitted.

In FIG. 8, the second plate 23 is shown by the broken line. The second plate 23 is formed so as to have a shallow dish shape. The second plate 23 has an external shape that covers a region of the first plate 22 excluding the fixing regions 21 from below. The second plate 23 includes a circumferential-edge region 23A, bead portions 25, and protruded portions 26. The circumferential-edge region 23A forms a circumferential edge of the second plate 23. The bead portions 25 extend in the longitudinal direction, in other words, in the left-right direction. The protruded portions 26 are provided at respective positions on the extension of the bead portions 25. Therefore, in this embodiment, the protruded portions 26 are provided at six positions in total. The second plate 23 is in contact with or is abutted against the first plate 22 at the circumferential-edge region 23A, a plurality of (three in this case) bead portions 25, and the protruded portions 26. Regions of the second plate 23 excluding regions in contact with the first plate 22 are bulged downward by a press molding, and thereby, the second plate 23 is made so as to have a dish shape.

Grooves 27 are respectively formed on both sides of the plurality of bead portions 25. An inlet depression 29 is formed around a plurality of (three in this case) protruded portions 26 arranged on a first side in the left-right direction. The inlet depression 29 includes an inlet 28. The inlet 28 is an inlet of the cooling medium and is positioned at the upstream side with respect to the flow direction of the cooling medium. An outlet depression 31 is formed around a plurality of (three in this case) protruded portions 26 arranged on a second side in the left-right direction. The outlet depression 31 includes an outlet 30. The outlet 30 is an outlet of the cooling medium and is positioned at the downstream side with respect to the flow direction of the cooling medium.

By providing the inlet 28 and the outlet 30 at the inlet depression 29 and the outlet depression 31, respectively, the inlet 28 and the outlet 30 are provided on the bottom surface of the second plate 23 facing against the first plate 22. In other words, the second plate 23 includes the inlet 28 and the outlet 30 on the bottom surface facing against the first plate 22. The inlet 28 is provided on the second plate 23 so as to open to and face against the first plate 22. The inlet 28 and the outlet 30 are respectively provided in a cooling space at separated positions at the upstream end and the downstream end with respect to the flow direction of the cooling medium. The inlet 28 and the outlet 30 are respectively provided at the same corresponding positions in the direction orthogonal to the flow direction. The inlet 28 and the outlet 30, which are arranged in this way, can be arranged along the flow direction of the cooling medium in the cooling space. The flow direction of the cooling medium in the cooling space can be set to the direction in which the bead portions 25 extend.

Channels 27A, an inlet-side space 29A, and an outlet-side space 31A are formed between the first plate 22 and the second plate 23 in a state in which the first plate 22 is stacked on the second plate 23 in a manner such that both plates are integrated. A plurality of (four in this case) the channels 27A are formed on both sides of bead portions 25. The channels 27A communicate the inlet-side space 29A with the outlet-side space 31A. The inlet-side space 29A is formed around the plurality of protruded portions 26 arranged on the first side described above. The outlet-side space 31A is formed around the plurality of protruded portions 26 arranged on the second side described above. The channels 27A, the inlet-side space 29A, and the outlet-side space 31A form the cooling space through which the cooling medium flows. Therefore, the cooling space is defined between the second plate 23 and the first plate 22.

Figure 9:
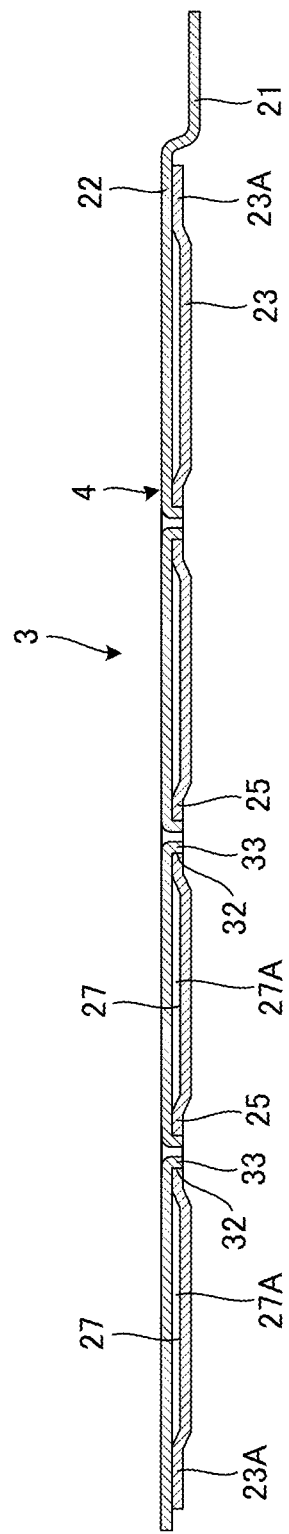
FIG. 9 is a sectional view taken along IX-IX in FIG. 8.
Figure 10:
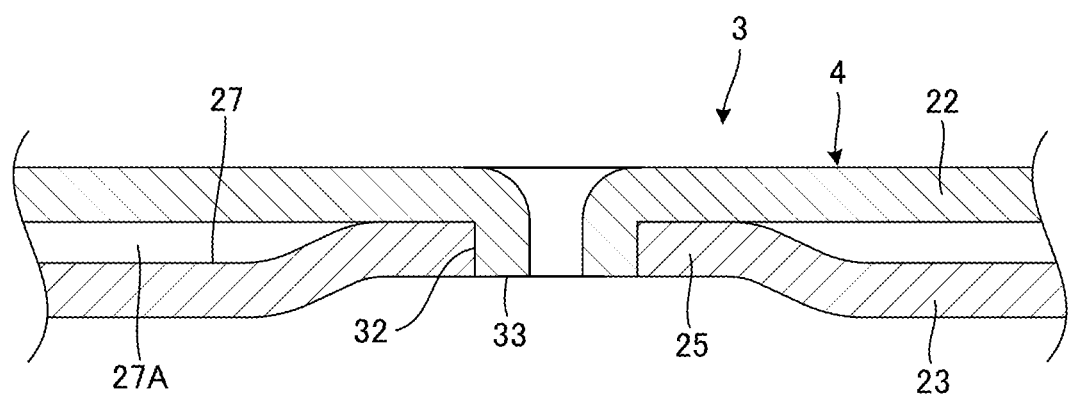
FIG. 10 is an explanatory diagram of a caulked structure.

As shown in FIGS. 9 and 10, through holes 32 are vertically formed at a plurality of positions between both end portions of the respective bead portions 25 of the second plate 23 in the longitudinal direction, on an abutting surface against the first plate 22. Similarly, the through holes 32 are also formed on the respective protruded portions 26 of the second plate 23, on an abutting surface against the first plate 22. Therefore, a sectional view taken along A-A in FIG. 8 will be similar to the sectional view taken along IX-IX in FIG. 8, which is shown in FIG. 9. Illustration of the sectional view taken along A-A in FIG. 8 is omitted. Cylindrical protrusions 33 protruding downward are respectively formed by burring processing at positions on the first plate 22 corresponding to the respective through holes 32. The first plate 22 is integrated with the second plate 23 by respectively inserting the protrusions 33 into the through holes 32, and by caulking the protrusions 33 to the through holes 32 like eyelets by expanding diameters of the respective protrusions 33 from the inside. As described above, by joining central regions of the first plate 22 and the second plate 23 with each other, it is possible to suppress expansion of the cooling member 4 even when the pressure of the cooling medium flowing through the interior space of the cooling member 4 is increased.

Figure 12:
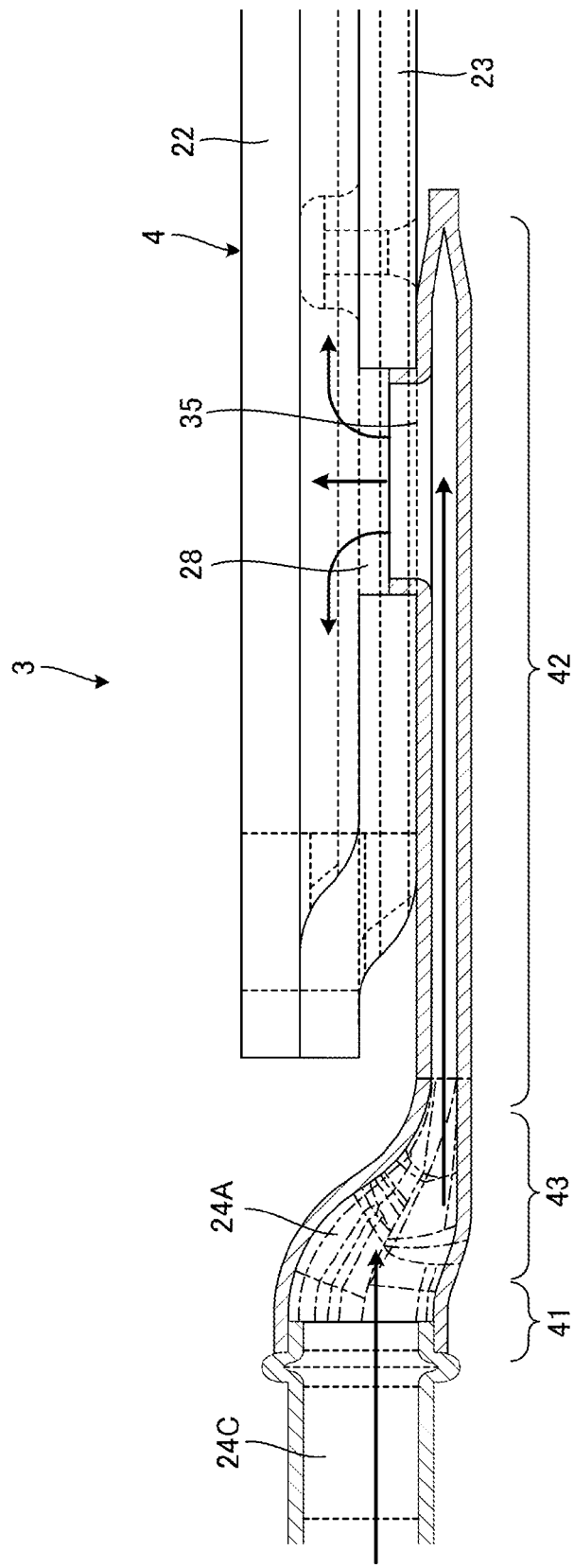
FIG. 12 is an explanatory diagram showing a structure of the connecting member and a connected state between the connecting member and the cooling member.

As shown in FIGS. 11 and 12, the inlet connecting member 24A is attached to the lower surface of the second plate 23. The inlet connecting member 24A includes a connecting port 35. The connecting port 35 of the inlet connecting member 24A is connected to the inlet 28. Similarly, the outlet connecting member 24B is attached to the lower surface of the second plate 23. Similarly to the inlet connecting member 24A, the outlet connecting member 24B includes the connecting port 35. The connecting port 35 of the outlet connecting member 24B is connected to the outlet 30. Both of the inlet connecting member 24A and the outlet connecting member 24B are configured with flat parts.

The inlet connecting member 24A and the outlet connecting member 24B individually have cylindrical regions 41, flat regions 42, and transition regions 43, and are formed to have L-shapes. The cylindrical region 41 is connected to the connector pipe 24C. The flat region 42 is the flat part. Specifically, the flat region 42 is the flat part that is made flat by decentering a flow-channel cross-section with respect to the cylindrical region 41. The transition region 43 connects the cylindrical region 41 to the flat region 42. Both of the inlet connecting member 24A and the outlet connecting member 24B include the connecting ports 35 in the flat regions 42. Both of the inlet connecting member 24A and the outlet connecting member 24B are laminated and arranged on the second plate 23 in a state in which the flat regions 42 are abutted against the second plate 23.

Both of the inlet connecting member 24A and the outlet connecting member 24B are laminated on the second plate 23 such that outer surfaces of the flat regions 42, which are the outer surfaces at the inner side in the decentering direction with respect to the cylindrical regions 41, are brought into contact with the second plate 23. The respective connecting ports 35 of the inlet connecting member 24A and the outlet connecting member 24B are arranged in the direction orthogonal to the flow direction of the cooling medium in the cooling space of the cooling member 4.

In this embodiment, a tube member having a small-diameter portion and a large-diameter portion is used as a material for both of the inlet connecting member 24A and the outlet connecting member 24B. The small-diameter portion is used as the cylindrical region 41, and by squeezing the large-diameter portion of the tube member downward, the large-diameter portion is flattened and decentered with respect to the small-diameter portion, thereby forming the flat region 42. As a result, a clearance space is formed in front of the small-diameter portion (the cylindrical region 41) and above the flat region 42. In this embodiment, the flat region 42 is formed by squeezing the large-diameter portion such that the channel cross-sectional area of the flat region 42 that is formed from the large-diameter portion becomes equivalent to the channel cross-sectional area of the cylindrical region 41 that is formed from the small-diameter portion. Therefore, even if the flat region 42 is included, the increase in resistance to the flow of the cooling medium from the cylindrical region 41 to the flat region 42 or from the flat region 42 to the cylindrical region 41 is suppressed.

Figure 13:
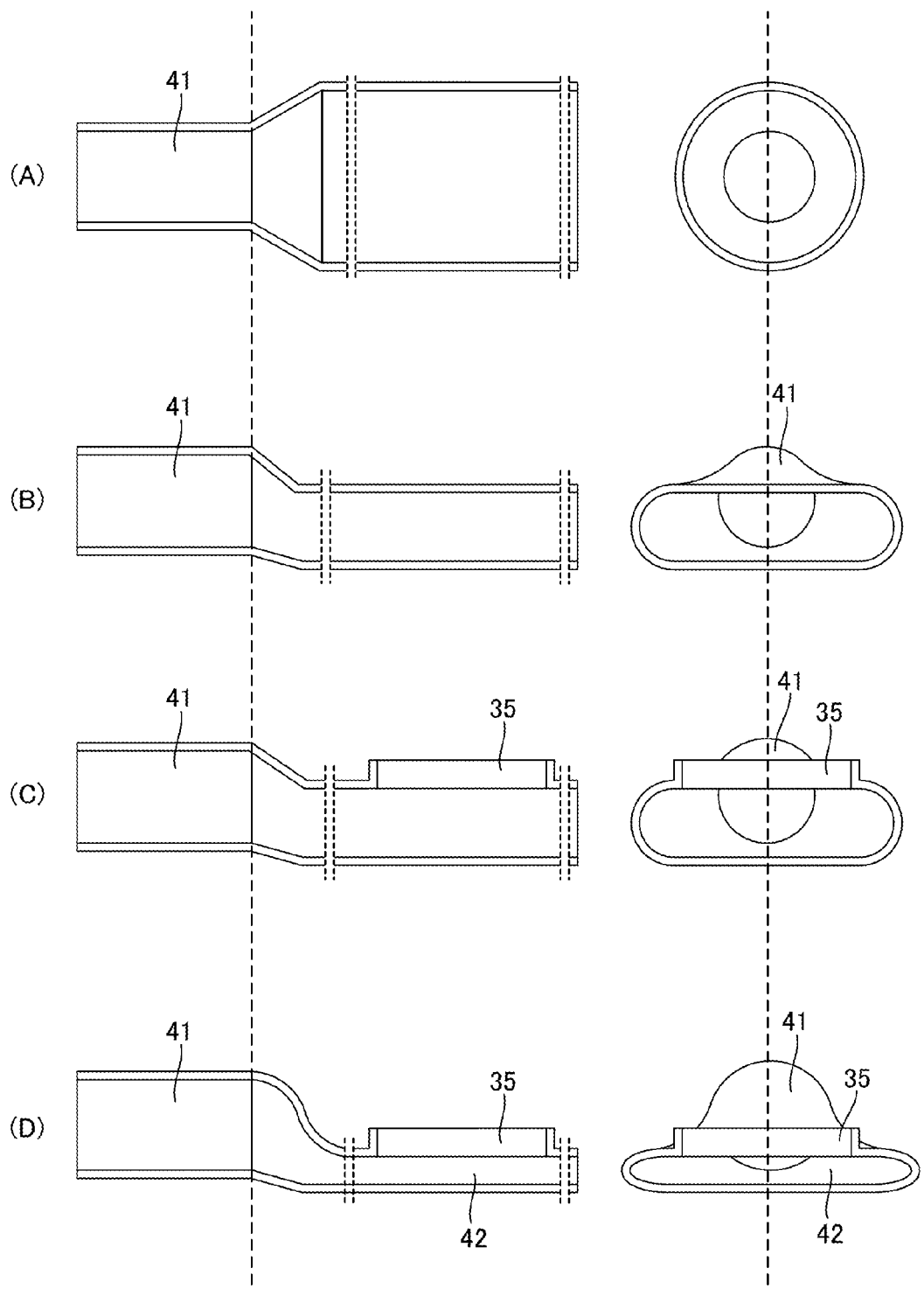
FIG. 13 is an explanatory diagram showing a forming process of the connecting member.

A method of forming each of the inlet connecting member 24A and the outlet connecting member 24B will be specifically described below. In other words, as shown in FIG. 13(A), a tube member having a small-diameter portion and a large-diameter portion is used as a material, and, as shown in FIG. 13(B), the large-diameter portion of the tube member is first squeezed such that the upper surface and the lower surface become flat. Next, as shown in FIG. 13(C), the cylindrical connecting port 35 that projects upward is provided on the top surface side of the flattened part by burring processing. As shown in FIG. 13(D), a forming is performed to flatten the vicinity of the burring-processed part. Furthermore, as shown in FIG. 12, an end portion of the large-diameter portion is squeezed and sealed such that only an opening at the tip end side is closed. By individually forming the inlet connecting member 24A and the outlet connecting member 24B as described above, it is possible to respectively form the inlet connecting member 24A and the outlet connecting member 24B from the tube members with ease. In such a forming method, the cylindrical regions 41 and the flat regions 42 are formed by decentering and squeezing the respective flow-channel cross-sections of the inlet connecting member 24A and the outlet connecting member 24B in the regions overlapped with the cooling member 4.

A method of assembling the inlet connecting member 24A is as follows. In other words, the inlet connecting member 24A is first arranged on the lower surface of the portion of the second plate 23 forming the inlet-side space 29A. The inlet 28 provided on the second plate 23 and the connecting port 35 are fitted, thereby communicating the inlet-side space 29A with the space in the inlet connecting member 24A. Next, the diameter of the connecting port 35 is increased from inside, and the inlet connecting member 24A and the second plate 23 are integrated by caulking the connecting port 35 to the inlet 28 of the second plate 23 like an eyelet.

A method of assembling the outlet connecting member 24B is as follows. In other words, the outlet connecting member 24B is first arranged on the lower surface of the portion of the second plate 23 forming the outlet-side space 31A. The outlet 30 provided on the second plate 23 and the connecting port 35 are fitted, thereby communicating the outlet-side space 31A with the space in the outlet connecting member 24B. Next, the diameter of the connecting port 35 is increased from inside, and the outlet connecting member 24B and the second plate 23 are integrated by caulking the connecting port 35 to the outlet 30 of the second plate 23 like an eyelet.

In accordance with the above description, a method of assembling the whole temperature adjustment device 3 is as follows. In other words, as described above, the inlet connecting member 24A and the outlet connecting member 24B are individually integrated with the second plate 23. Next, the first plate 22 is covered on the second plate 23, and the cylindrical protrusions 33 of the first plate 22 are inserted into the through holes 32 of the second plate 23, respectively. Next, the diameters of the protrusions 33 are individually increased from the inside, and the first plate 22 and the second plate 23 are integrated by caulking the protrusions 33 to the through holes 32 like eyelets.

With the temperature adjustment device 3 that has been assembled as above, there are gaps at a joining portion between the first plate 22 and the second plate 23, and at joining portions between the second plate 23 and each of the inlet connecting member 24A and the outlet connecting member 24B. Therefore, leakage of the cooling medium is caused in this state. In order to prevent the leakage, the respective joining portions are coated with a brazing filler metal before the assembly and the pars are passed through a heating furnace, or the respective joining portions of the assembled temperature adjustment device 3 are coated with a brazing filler metal and the temperature adjustment device 3 is passed through a heating furnace. By doing so, the first plate 22, the second plate 23, the inlet connecting member 24A, and the outlet connecting member 24B are subjected to brazing such that the gaps are filled with molten brazing filler metal. The temperature adjustment device 3 is completed in a state in which the brazing has been performed in this way.

The temperature adjustment device 3 according to this embodiment having the above-mentioned configuration includes the cooling member 4 that is constituted of the first plate 22 and the second plate 23, the inlet connecting member 24A, and the outlet connecting member 24B. With the temperature adjustment device 3 having such a configuration, the inlet connecting member 24A and the outlet connecting member 24B are configured such that pipe pathways are flat, and the inlet connecting member 24A and the outlet connecting member 24B are laminated and arranged on the lower surface of the cooling member 4, and thereby, the cooling medium is supplied/discharged to/from the lower surface of the cooling member 4.

With the temperature adjustment device 3 having such a configuration, it is possible to make the dimensions of the inlet connecting member 24A and the outlet connecting member 24B in the vertical direction small. In combination with the fact that limitation caused to the thicknesswise dimension of the cooling member 4 by the respective dimensions of the inlet connecting member 24A and the outlet connecting member 24B in the vertical direction is reduced, it is possible to make the dimension of the temperature adjustment device 3 in the vertical direction small. As a result, it is possible to reduce the size of the power storage apparatus 1 by reducing the dimension of the power storage apparatus 1 in the vertical direction of the vehicle, thereby making it possible to increase a living space in a cabin (a space at rear seats).

Both of the inlet connecting member 24A and the outlet connecting member 24B individually have the cylindrical regions 41, the flat regions 42, and the transition regions 43, and are formed so as to have an L-shape. In this case, it is possible to add only the height dimension of the flat region 42 to the height dimension of the cooling member 4. As a result, it is possible to reduce the height dimension of the temperature adjustment device 3.

The cooling member 4 is formed so as to have the dimension flatter than the respective diameters of the cylindrical regions 41 of the inlet connecting member 24A and the outlet connecting member 24B. In this case, it is also possible to reduce the dimension of the cooling member 4 in the vertical direction.

Both of the inlet connecting member 24A and the outlet connecting member 24B are laminated on the second plate 23 such that the outer surfaces of the flat regions 42, which are the outer surfaces at the inner side in the decentering direction with respect to the cylindrical regions 41, are brought into contact with the second plate 23 of the cooling member 4. In this case, it is possible to arrange a portion of the cylindrical region 41 in a region overlapped with the cooling member 4 in the top-down direction. As a result, it is possible to reduce the height dimension of the temperature adjustment device 3 including the inlet connecting member 24A and the outlet connecting member 24B.

The respective connecting ports 35 of the inlet connecting member 24A and the outlet connecting member 24B are arranged in the direction orthogonal to the flow direction of the cooling medium in the cooling space of the cooling member 4. In this case, the flow direction of the cooling medium that flows in from the inlet connecting member 24A and flows out from the outlet connecting member 24B is changed from the flow direction in the inlet connecting member 24A to the flow direction in the cooling space, and thereafter, the flow direction of the cooling medium is changed from the flow direction in the cooling space to the flow direction in the outlet connecting member 24B. Because the flow direction is changed, it is possible to suppress the flow of the cooling medium into flow-in/flow-out directions. As a result, it is possible to achieve uniform flow rate distribution in the cooling space.

The inlet 28 is provided on the second plate 23 so as to open to and face against the first plate 22. In this case, the cooling medium is supplied upwards from bottom in the top-down direction of the vehicle that is orthogonal to the cooling space. Thereafter, the flow direction of the cooling medium is changed from the upwards direction to the plane direction that forms the cooling space. Because the flow direction is changed, it is possible to suppress the flow of the cooling medium into flow-in direction. As a result, it is possible to achieve uniform flow rate distribution in the cooling space.

The inlet 28 and the outlet 30 are respectively provided in a cooling space at separated positions at the upstream end and the downstream end with respect to the flow direction of the cooling medium, and are arranged at the same corresponding positions in the direction orthogonal to the flow direction. In this case, it is possible to arrange the inlet connecting member 24A and the outlet connecting member 24B on the cooling member 4 in the same manner. As a result, connection of the inlet connecting member 24A and the outlet connecting member 24B to the temperature adjustment circuit 8 is easily achieved.

With the temperature adjustment device 3, the cylindrical regions 41 and the flat regions 42 are formed by squeezing the respective regions of the inlet connecting member 24A and the outlet connecting member 24B that are overlapped with the cooling member 4 such that the flow-channel cross-section is decentered. In this case, it is possible to respectively form the inlet connecting member 24A and the outlet connecting member 24B with ease.

(Second Embodiment)

Figure 14:
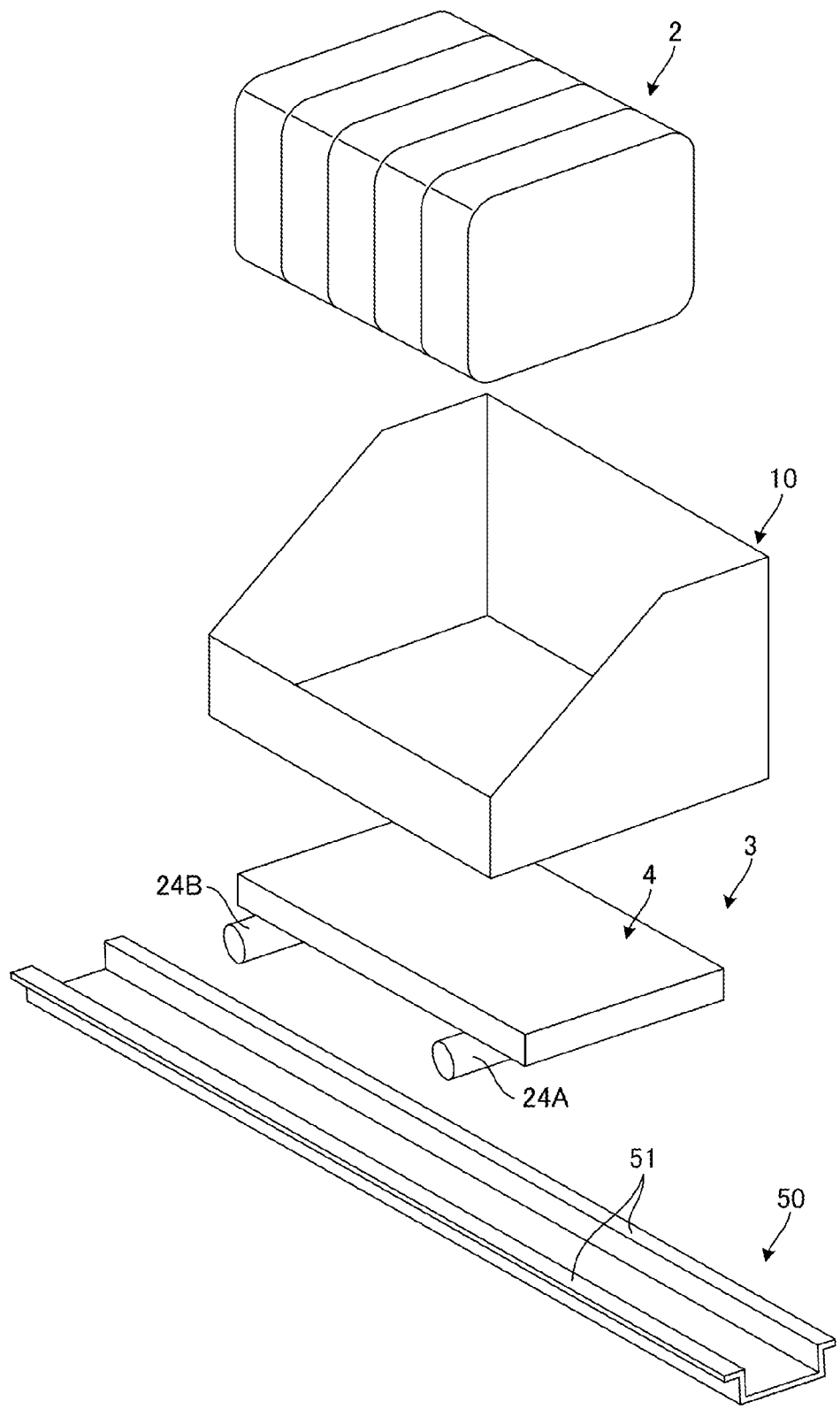
FIG. 14 is a diagram showing the power storage apparatus including the temperature adjustment device according to a second embodiment in a disassembled state.
Figure 15:
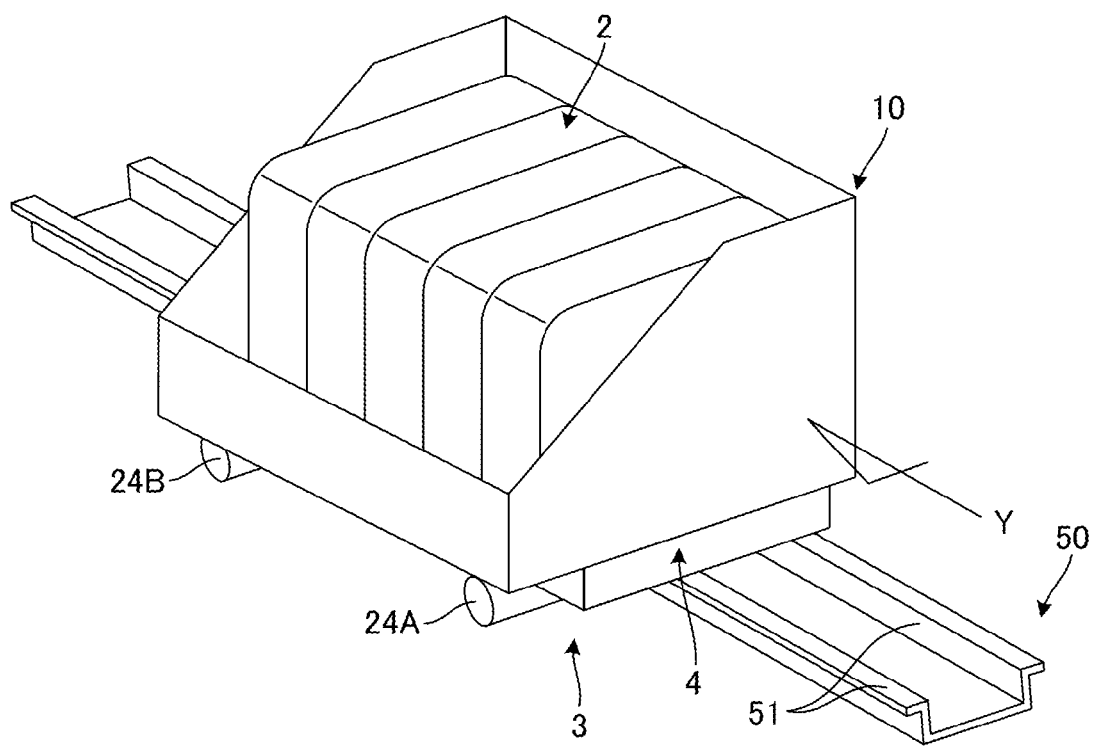
FIG. 15 is a diagram showing the power storage apparatus including the temperature adjustment device according to the second embodiment in an assembled state.
Figure 16:
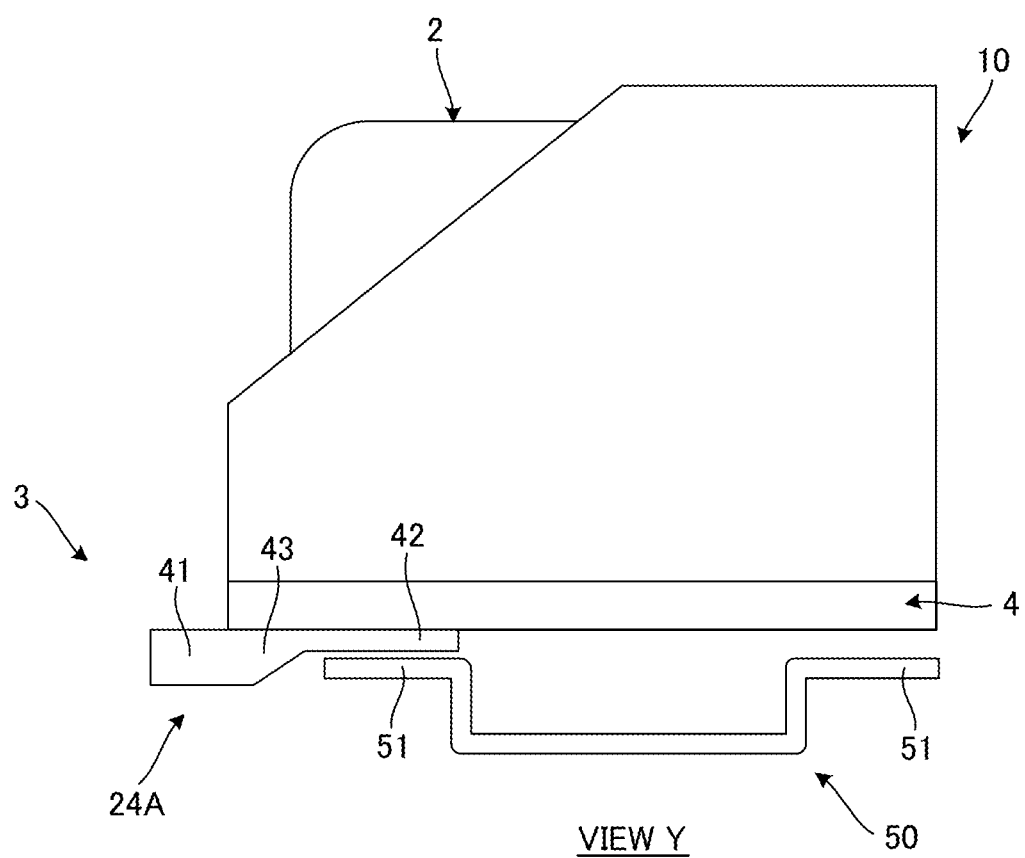
FIG. 16 is a view taken along an arrow Y in FIG. 15.

FIG. 14 is a diagram showing the power storage apparatus 1 including the temperature adjustment device according to the second embodiment in a disassembled state. FIG. 15 a diagram showing the power storage apparatus 1 including the temperature adjustment device according to the second embodiment in a state in which the power storage apparatus 1 is mounted to a vehicle body member. FIG. 16 is a view taken along an arrow Y in FIG. 15. In this embodiment, the temperature adjustment device 3 is arranged below the battery case 10. Components that are the same as or equivalent to those in the first embodiment are given the same reference signs, and descriptions thereof will be omitted or simplified.

As shown in FIG. 14, with the power storage apparatus 1 in this embodiment, the plurality of battery modules 2 are directly accommodated in the battery case 10 so as to be arrayed in the left-right direction. Next, the temperature adjustment device 3 is attached to the battery case 10 so as to be in contact with the bottom portion of the battery case 10 at the top surface thereof. The cooling member 4 is formed in the similar manner as in the first embodiment. In FIG. 14, illustration of the fixing regions 21 is omitted. As with the first embodiment, both of the inlet connecting member 24A and the outlet connecting member 24B individually have the cylindrical regions 41, the flat regions 42, and the transition regions 43, and are formed so as to have an L-shape. A cooling efficiency may be improved by providing a heat-conducting member between the bottom surfaces of the battery modules 2 and the cooling member 4.

In this embodiment, both of the inlet connecting member 24A and the outlet connecting member 24B are laminated on the second plate 23 such that the outer surfaces of the flat regions 42, which are the outer surfaces at the outer side in the decentering direction with respect to the cylindrical regions 41, are brought into contact with the second plate 23. In addition, both of the inlet connecting member 24A and the outlet connecting member 24B are provided such that the outer surfaces of the flat regions 42, which are the outer surfaces at the inner side in the decentering direction with respect to the cylindrical regions 41, face against a cross member 50 provided on the vehicle. The flat region 42 is attached to the cooling member 4 using the same attaching method as in the first embodiment. The cross member 50 is a part of the vehicle body. The cross member 50 includes flat-surface portions 51. The flat-surface portions 51 are arranged at both end portions of the cross member 50 in the front-rear direction so as to form a U-shaped cross-section.

The lower surface of the battery case 10 accommodating the power storage apparatus 1 is fixed to the temperature adjustment device 3 by bolts etc. so as to be in contact with the top surface of the temperature adjustment device 3. Both of the inlet connecting member 24A and the outlet connecting member 24B are arranged such that the flat regions 42 face against the flat-surface portions 51 on the front side.

In this embodiment, both of the inlet connecting member 24A and the outlet connecting member 24B are laminated on the second plate 23 such that the outer surfaces of the flat regions 42, which are the outer surfaces at the outer side in the decentering direction with respect to the cylindrical regions 41, are brought into contact with the second plate 23. In addition, both of the inlet connecting member 24A and the outlet connecting member 24B are provided such that the outer surfaces of the flat regions 42, which are the outer surfaces at the inner side in the decentering direction with respect to the cylindrical regions 41, face against the cross member 50 provided on the vehicle.

According to such a configuration, it is possible to avoid interference between the cross member 50 and the respective cylindrical regions 41 of the inlet connecting member 24A and the outlet connecting member 24B. In addition, in combination with the fact that limitation caused to the thicknesswise dimension of the cooling member 4 by the respective dimensions of the inlet connecting member 24A and the outlet connecting member 24B in the vertical direction is reduced, it is possible to make the dimension of the temperature adjustment device 3 in the vertical direction small. Therefore, it is possible to reduce the height dimension from the cross member 50 of the temperature adjustment device 3 including the inlet connecting member 24A and the outlet connecting member 24B. As a result, it is possible to reduce the dimension of the power storage apparatus 1 from the cross member 50 in the vertical direction of the vehicle, thereby making it possible to increase a living space in a cabin (a space at rear seats).

Although the embodiments of the present invention have been described in the above, the above-mentioned embodiments merely illustrate a part of application examples of the present invention, and the technical scope of the present invention is not intended to be limited to the specific configurations in the above-mentioned embodiments.

In the above-mentioned embodiment, as the temperature adjustment device 3, a description has been given of a device that is brought thermally into contact with the bottom surfaces of the plurality of battery modules 2 and that adjusts the temperature of these battery modules 2 through the bottom surfaces thereof. However, the temperature adjustment device 3 may be configured so as to be thermally in contact with side surfaces or top surfaces of the plurality of battery modules 2 and to adjust the temperature of these battery modules 2.

In the above-mentioned embodiment, as each of the inlet connecting member 24A and the outlet connecting member 24B, a description has been given of a member in which the flat region 42 is formed by decentering and squeezing a part of a tube member. However, each of the inlet connecting member 24A and the outlet connecting member 24B may be formed by forming the cylindrical region 41, the flat region 42, and the transition region 43 separately, and by connecting these parts by welding etc.

In the above-mentioned embodiment, although a description has been given of a case in which the temperature of the plurality of battery modules 2, as heat-generating members, is adjusted by the temperature adjustment device 3, it is possible to apply the temperature adjustment device 3 to temperature adjustment of any heat-generating members including other components or equipment.

The present application claims priority of Japanese Patent Application No. 2013-076154 filed with the Japan Patent Office on Apr. 1, 2013, all the contents of which are hereby incorporated into this specification by reference.

The invention claimed is:

1. A temperature adjustment device comprising:
a cooling member consisting of a first plate and a second plate, the first plate being thermally abutted against a heat-generating member, and the second plate being stacked on a lower surface of the first plate to define a cooling space with the first plate, the cooling space has a cooling medium which flows through, and being configured to include an inlet and an outlet of the cooling medium on a bottom surface facing against the first plate; and
a connecting member that is a connecting member to a temperature adjustment circuit, the connecting member being configured with a tube member having a flat part, the connecting member including a connecting port connected to the inlet or the outlet on the flat part, and the connecting member being laminated and arranged on the second plate such that the flat part is abutted against the second plate,
wherein
the connecting member has a cylindrical region, a flat region, and a transition region, the flat region being flattened such that a flow-channel cross-section is decentered with respect to the cylindrical region, and the transition region being configured to connect the cylindrical region and the flat region.

2. The temperature adjustment device according to claim 1, wherein
the cooling member is formed so as to have a dimension flatter than a diameter of the cylindrical region.

3. The temperature adjustment device according to claim 1, wherein
the connecting member is laminated on the second plate such that an outer surface of the flat region, the outer surface being at inner side in a decentering direction with respect to the cylindrical region, is brought into contact with the second plate.

4. The temperature adjustment device according to claim 3, wherein
the connecting port is arranged in a direction orthogonal to a flow direction of the cooling medium in the cooling space.

5. The temperature adjustment device according to claim 4, wherein
the inlet is provided on the second plate so as to open to and face against the first plate.

6. The temperature adjustment device according to claim 5, wherein
the inlet and the outlet are arranged at separated positions at an upstream end and a downstream end in the flow direction of the cooling medium in the cooling space, and are arranged at the same corresponding positions in the direction orthogonal to the flow direction.

7. The temperature adjustment device according to claim 1, wherein
the connecting member is laminated on the second plate such that an outer surface of the flat region, the outer surface being at outer side in a decentering direction with respect to the cylindrical region, is brought into contact with the second plate, thereby facing an outer surface of the flat region, the outer surface being at inner side in the decentering direction with respect to the cylindrical region, against a cross member provided on a vehicle.

8. The temperature adjustment device according to claim 7, wherein
the connecting port is arranged in a direction orthogonal to a flow direction of the cooling medium in the cooling space.

9. The temperature adjustment device according to claim 8, wherein
the inlet is provided on the second plate so as to open to and face against the first plate.

10. The temperature adjustment device according to claim 9, wherein
the inlet and the outlet are arranged at separated positions at an upstream end and a downstream end in the flow direction of the cooling medium in the cooling space, and are arranged at the same corresponding positions in the direction orthogonal to the flow direction.

11. The temperature adjustment device according to claim 1, wherein
the cylindrical region and the flat region are formed, the flat region being flattened such that the flow-channel cross-section is decentered with respect to the cylindrical region by squeezing a region of the connecting member such that the flow-channel cross-section of the connecting member is decentered, the region of the connecting member being overlapped with the cooling member.

* * * * *